United States Patent
Hanes et al.

(10) Patent No.: US 11,140,096 B2
(45) Date of Patent: Oct. 5, 2021

(54) OPTIMIZING FOG ORCHESTRATION THROUGH EDGE COMPUTE RESOURCE RESERVATION

(71) Applicant: Cisco Technology, Inc., San Jose, CA (US)

(72) Inventors: M. David Hanes, Lewisville, NC (US); Charles Calvin Byers, Wheaton, IL (US); Joseph Michael Clarke, Cary, NC (US); Gonzalo A. Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 15/891,189

(22) Filed: Feb. 7, 2018

(65) Prior Publication Data

US 2019/0245806 A1 Aug. 8, 2019

(51) Int. Cl.
*H04L 12/911* (2013.01)
*H04L 29/08* (2006.01)
*H04L 12/925* (2013.01)

(52) U.S. Cl.
CPC .......... *H04L 47/827* (2013.01); *H04L 47/722* (2013.01); *H04L 67/28* (2013.01)

(58) Field of Classification Search
CPC ... H04L 47/827; H04L 41/5051; H04L 47/78; H04L 47/781; H04L 47/805; H04L 67/2809; G06F 2209/509; Y02D 10/24; Y02D 10/22

See application file for complete search history.

(56) References Cited

U.S. PATENT DOCUMENTS

| 8,037,475 B1 * | 10/2011 | Jackson | G06F 9/5005 |
| | | | 718/104 |
| 9,015,324 B2 | 4/2015 | Jackson | |
| 9,489,243 B2 * | 11/2016 | Srikanth | G06F 9/5061 |
| 9,742,684 B1 * | 8/2017 | Krotkov | H04L 47/70 |
| 10,061,621 B1 * | 8/2018 | Chen, II | G06F 9/4843 |
| 10,261,838 B2 * | 4/2019 | Sexton | G06F 21/6218 |
| 2006/0271544 A1 * | 11/2006 | Devarakonda | G06F 9/5027 |
| 2007/0002897 A1 * | 1/2007 | Goshen | H04L 41/0893 |
| | | | 370/468 |
| 2007/0147427 A1 * | 6/2007 | Berde | H04L 45/00 |
| | | | 370/469 |

(Continued)

OTHER PUBLICATIONS

M. Aazam, E. Huh, Fog Computing Micro Datacenter Based Dynamic Resource Estimation and Pricing Model for IoT (2015), doi: 10.1109/aina.2015.254 (Year: 2015).*

(Continued)

*Primary Examiner* — Dhairya A Patel
*Assistant Examiner* — Alex H. Tran
(74) *Attorney, Agent, or Firm* — Patterson + Sheridan, LLP

(57) ABSTRACT

Embodiments herein receive a request to reserve a fog computing resource for an end device, where the request includes a specified future time at which the fog computing resource will be used by the end device. It is determined that sufficient fog computing resources are available at the specified future time on a first fog node of a plurality of fog nodes. The fog computing resource of the first fog node is reserved for the specified future time, and an address corresponding to the first fog node is transmitted.

19 Claims, 9 Drawing Sheets

(56) References Cited

U.S. PATENT DOCUMENTS

| | | | | |
|---|---|---|---|---|
| 2007/0254728 | A1* | 11/2007 | Moallemi | H04B 1/7163 455/574 |
| 2011/0082935 | A1* | 4/2011 | Zetterman | H04L 67/04 709/226 |
| 2011/0145393 | A1* | 6/2011 | Ben-Zvi | G06F 9/5011 709/224 |
| 2011/0271309 | A1* | 11/2011 | Chetlur | H04N 21/6131 725/91 |
| 2012/0042256 | A1* | 2/2012 | Jamjoom | G06F 9/5011 715/736 |
| 2012/0179824 | A1* | 7/2012 | Jackson | G06F 9/5072 709/226 |
| 2013/0019015 | A1* | 1/2013 | Devarakonda | G06F 9/5072 709/226 |
| 2013/0304903 | A1* | 11/2013 | Mick | H04L 67/10 709/224 |
| 2014/0046716 | A1* | 2/2014 | Black | G06Q 10/02 705/7.19 |
| 2014/0289412 | A1* | 9/2014 | Doddavula | H04L 41/5003 709/226 |
| 2015/0215228 | A1* | 7/2015 | McMurry | H04L 47/822 709/226 |
| 2015/0261274 | A1* | 9/2015 | Ahnn | G06F 1/329 713/340 |
| 2015/0317081 | A1* | 11/2015 | Singh | G06F 9/48 711/114 |
| 2015/0350108 | A1* | 12/2015 | Baughman | H04L 47/823 709/226 |
| 2016/0036920 | A1* | 2/2016 | Sama | H04L 63/08 709/203 |
| 2016/0253215 | A1* | 9/2016 | Fang | G06F 9/50 718/104 |
| 2016/0266936 | A1* | 9/2016 | Bryant | G06F 9/5011 |
| 2016/0300162 | A1* | 10/2016 | McManus | G07B 15/02 |
| 2016/0301624 | A1* | 10/2016 | Gonzalez | G06F 9/5083 |
| 2016/0373377 | A1* | 12/2016 | Cao | G06F 9/5088 |
| 2017/0048308 | A1* | 2/2017 | Qaisar | H04L 67/12 |
| 2017/0093642 | A1* | 3/2017 | Chin | G06Q 20/14 |
| 2017/0155710 | A1 | 6/2017 | Quinn et al. | |
| 2017/0270450 | A1* | 9/2017 | Binotto | H04L 43/0876 |
| 2017/0337091 | A1* | 11/2017 | Liu | G06F 9/50 |
| 2018/0109428 | A1* | 4/2018 | Kattepur | H04L 43/0852 |
| 2018/0176148 | A1* | 6/2018 | Ku | H04L 67/22 |
| 2018/0302340 | A1* | 10/2018 | Alvarez Callau | H04L 47/76 |
| 2019/0215381 | A1* | 7/2019 | Mukund | H04L 67/1008 |

OTHER PUBLICATIONS

O. Skarlat, S. Schulte, M. Borkowski, Resource Provisioning for IoT Services in the Fog (2016), doi: 10.1109/soca.2016.10 (Year: 2016).*

Y. Ai, M. Peng, K. Zhang, Edge cloud computing technologies for internet of things: A primer, Digital Communications and Networks (2017), doi: 10.1016/j.dcan.2017.07.001 (Year: 2017).*

S. Shekhar, A. Gokhale, Dynamic Resource Management Across Cloud-Edge Resources for Performance-Sensitive Applications (2017), doi: 10.1109/ccgrid.2017.120 (Year: 2017).*

Mohammad Aazam and Eui-Nam Huh, "Fog Computing Micro Datacenter Based Dynamic Resource Estimation and Pricing Model for Io T," IEEE Xplore Digital Library, Mar. 24-27, 2015. [Abstract Only] http://ieeexplore.ieee.org/document/7098039/ [Accessed Online Jan. 15, 2018].

Skarlat et al., "Resource Provisioning for IoT Services in the fog," 8 pages.

Yi et al, "LAVEA: Latency-aware Video Analytics on Edge Computing Platform," 2017 IEEE 37th International Conference on Distributed Computing Systems, 2 pages.

Shashank Shekhar and Aniruddha, "Dynamic Resource Management Across Cloud-Edge Resources for Performance-Sensitive Application," Vanderbilt University, 4 pages.

Ai et al, "Edge Cloud Computing Technologies for Internet of things: A primer" Digital Communications and Networks, Accepted Jun. 2, 2017, 26 pages.

* cited by examiner

OPTIMIZING FOG ORCHESTRATION THROUGH EDGE COMPUTE RESOURCE RESERVATION

TECHNICAL FIELD

Embodiments presented in this disclosure generally relate to fog computing. More specifically, embodiments disclosed herein relate to reservation of fog computing resources.

BACKGROUND

Cloud computing has become a tremendous force in modern networks. Cloud computing generally refers to the provision of scalable computing resources near the center of a network, such as in a data center or server farm. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Furthermore, the Internet of Things (IoT) has expanded dramatically. Generally, the IoT refers to a large number of interconnected devices including phones, watches, televisions, automobiles, drones, and the like. These devices frequently utilize cloud and/or fog computing resources in order to make up for the relatively limited computing resources on each local IoT device. Additionally, even if a given end device has sufficient computing resources for the desired tasks, it is often more efficient to offload the resource usage to the cloud and/or fog in order to reduce power consumption on the IoT device.

Cloud computing also involves drawbacks ranging from long latency, high network bandwidth use, security problems, and reliability concerns. Because cloud computing resources are located near the center of the network, use of cloud computing resources near the center of the network by an end device near the edge of the network (e.g., an IoT device) often involves high latency. Similarly, Transmitting the data to and from cloud centers involves using substantial amounts of bandwidth that may be better utilized for other purposes, and requires the end device to delay operations because of the latency. Additionally, end devices often find that no computing resources are available when they are needed due to network overload, reliability issues, or security concerns with cloud-based solutions. Some of these problems are mitigated by migrating compute capabilities to nodes at the edge of the network, often referred to as fog or edge computing, but difficulties remain.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
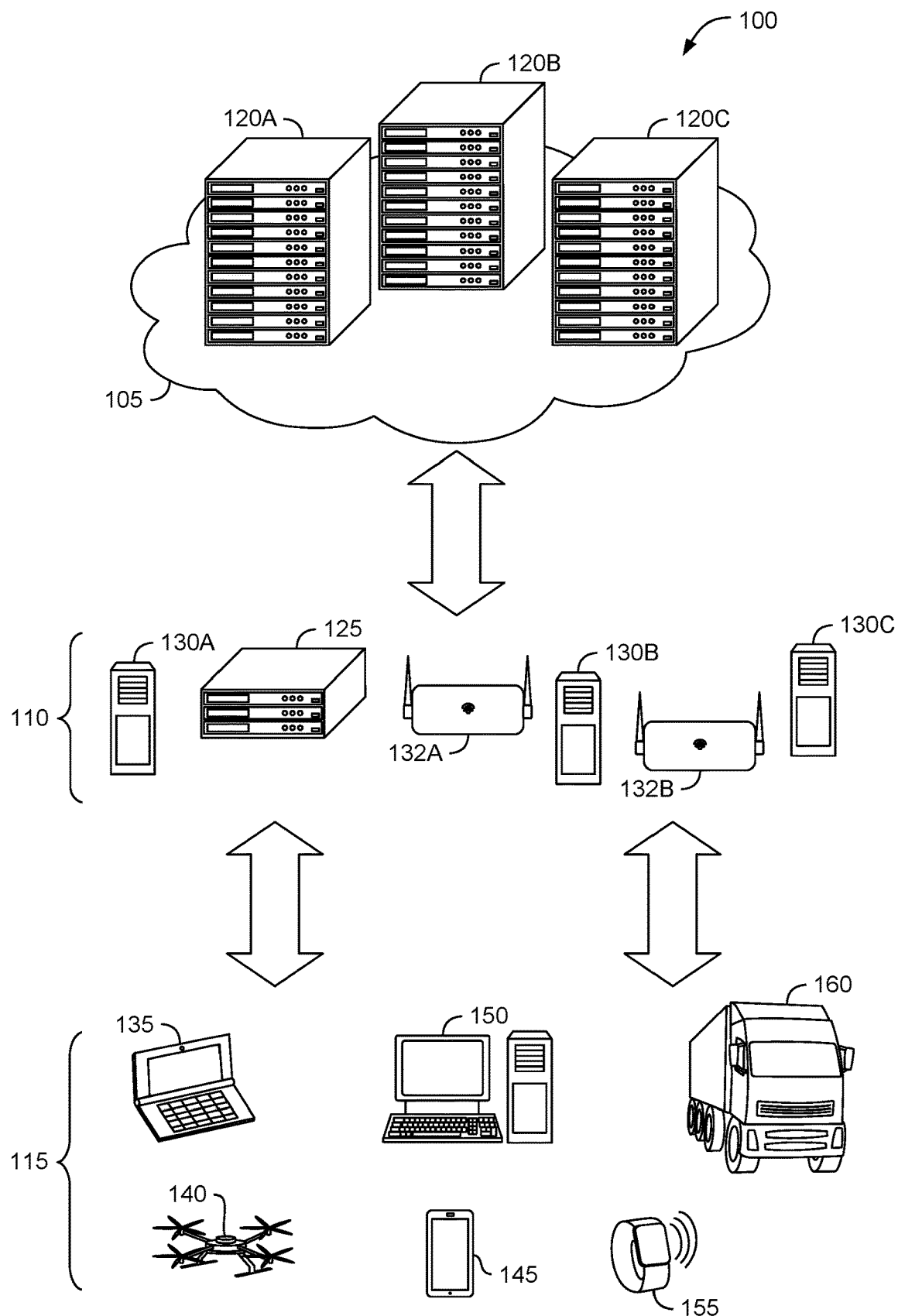
FIG. 1 illustrates a network topology including cloud computing resources, fog computing resources, and end devices, according to one embodiment disclosed herein.

An embodiment present in this disclosure is one or more non-transitory tangible media encoding logic that includes instructions for execution that when executed by a processor, is operable to perform an operation including receiving a request to reserve a fog computing resource for an end device, where the request includes a specified future time at which the fog computing resource will be used by the end device. The operation also includes determining that sufficient fog computing resources are available at the specified future time on a first fog node of a plurality of fog nodes. The operation further includes reserving the fog computing resource of the first fog node for the specified future time, and transmitting an address corresponding to the first fog node.

Another embodiment disclosed herein is a system including an end device comprising a load application configured to estimate future resource usage for a future operation to be executed by the end device at a future time and transmit a request to reserve one or more fog computing resources to satisfy the estimated future resource usage. The system also includes a fog orchestrator comprising a reservation application configured to receive the request from the end device, where the request comprises the future time and a duration. The reservation application is further configured to determine that sufficient fog computing resources are available at the future time on at least a first fog node of a plurality of fog nodes, and reserve one or more fog computing resources of the first fog node for the future time. Finally, the reservation application is configured to transmit the address corresponding to the first fog node to the end device.

Example Embodiments

In order to mitigate the latency and SE problems introduced by cloud computing, computing resources can be moved away from the center of the network and towards the edges. For example, rather than using large and powerful data centers at the center of the network for all computing resources, pools of computing resources are located near the edges of the network. For example, in some embodiments, fog computing resources are provided by routers, switches, and other network devices at the edge of the network, rather than by a collection of servers in a centralized location. As used herein, fog computing or edge computing generally refers to utilizing computing resources from one or more computer systems that are located near the edge of the network, situated between the end devices and the cloud center.

In order to ensure efficient utilization of computing resources, embodiments of the present disclosure reserve fog computing resources before they are required, which allows for more reliable provisioning of the resources. In one embodiment, edge devices (e.g., fog orchestrators) used to manage fog resource can also receive requests to reserve fog computing resources for future use by end devices (e.g., user devices or IoT devices). These reservations can begin at a point in the future, or immediately. In this way, end devices can be sure that fog computing resources will be available at the required time. In various embodiments, reservation requests may include a load profile of the expected workload, a length of time that the resources will be used, specific types of resources (i.e. CPUs, GPUs, FPGAs, disks or flash storage), and the like. Additionally, in some embodiments, reservation requests can include information about security, reliability, redundancy, performance, and other relevant factors. Furthermore, in some embodiments, reservations can be made by a proxy, such as a cloud process, on behalf of one or more end devices.

FIG. 1 illustrates a Network Topology 100 including computing resources in the Cloud 105, computing resources in the Fog 110, and End Devices 115, according to one embodiment disclosed herein. As illustrated, the Cloud Resources 105 includes three Server Racks 120A-C. Generally, the Cloud 105 refers to centralized computing resources that are located near the center of the Network Topology 100 and provide resources to end devices (such as IoT devices and user devices). Computing resources as used herein includes hardware resources such as processing capabilities on one or more processing units (including various types, such as central processing units (CPUs) and graphics processing units (GPUs)), storage capacity (whether volatile or non-volatile), and the like. Similarly, in embodiments, computing resources can include software resources such as web applications, image and voice processing, and the like. Generally, computing resources can include any sort of resource that an End Device 115 utilizes in operation.

The illustrated topology 100 also includes Fog 110, which includes a variety of computing resources. For example, as illustrated, the Fog 110 includes a server rack 125, two routers or switches 132A-B, and other servers or computer systems 130A-C. In some embodiments, the fog computing resources generally do not include servers such as server rack 125. In one embodiment, the Fog 110 generally includes individual routers, switches, and other network devices (e.g., mounted on top of poles at the edge of the network) that have available computing resources. Typically, the Fog 110 includes computing resources which are more dispersed than the Cloud 105 and each individual device is typically less powerful. While the Cloud 105 may be a collection of computing systems clustered in data centers, in one embodiment each Fog 110 resource is a computing node (e.g., a single switch or router) rather than a larger data center. As illustrated, the Fog 110 resources are located near the edges of the Network Topology 100. For example, in one embodiment, the Fog Resources 110 are located on a cluster of routers or switches in a common geographic location. Further, although Fog 110 is depicted as a single layer, in some embodiments, the Fog 110 can consist of a hierarchy of several layers between the Cloud 105 and the End Devices 115.

Generally, the Fog 110 resources are located closer in the Network Topology 100 to the End Devices 115 than are the Cloud 105 resources. Additionally, the Fog 110 resources can be geographically closer to the End Devices 115. For example, in one embodiment, the Fog 110 resources used by a given End Device 115 are within a few miles of the End Device 115, while the Cloud 105 resources may be many hundreds or thousands of miles away. The Fog 110 resources are generally associated with reduced latency as compared to the Cloud 105 resources because of the shorter distance, both geographically and communicatively via the Network Topology 100.

In addition, the illustrated Network Topology 100 includes a number of End Devices 115. In one embodiment, the End Devices 115 include IoT devices such as wearables, appliances, vehicles, and the like. Generally, the End Devices 115 are devices, which may or may not be mobile devices, that can utilize remote resources for one or more applications or operations. For example, End Devices 115 may access software resources, offload processing requirements, storage requirements, and the like to one or more of the Fog 110 resources or Cloud 105 resources to reduce the workload on the End Device 115. Similarly, in some embodiments, the operation cannot or should not be completed on the End Device 115, and are therefore offloaded.

In various embodiments, work may be offloaded because the operation requires more processing power or storage than the End Device 115 contains. Similarly, in some embodiments, a workload is offloaded to the Fog 110 because it involves a type of processing that is not available on the local End Device 115. For example, the workload may involve digital signal processing that cannot be accomplished on the End Device 115 (or cannot be accomplished in a timely manner), or may require audio processing or other processing that cannot or should not be completed locally.

Further, in some embodiments, the operation can be completed by the End Device 115, but can be completed more efficiently or quickly by one or more remote resources. For example, an End Device 115 may transmit audio to a Fog Resources 110 for processing via software resources such as voice recognition models, speech-to-text processing, and natural language processing. Similarly, images may be transmitted for image processing. In an embodiment, any workload may be offloaded because one or more Fog 110 nodes can execute the workload more efficiently or rapidly.

In the illustrated topology 100, the End Devices 115 include a laptop 135, a drone 140, a smart phone 145, a desktop computer 150, a smart watch 155, and a smart truck 160. In some embodiments, each End Device 115 may have unique needs when offloading a workload to the Fog Resources 110. For example, the laptop 135 may want to ensure that its data is protected with a minimum level of security, while the desktop computer 150 may desire some level of redundancy in the Fog 110 in case some of the resources in the Fog 110 fail when performing an operation for the desktop computer 150. Similarly, the drone 140 or self-driving truck 160 might perform better with very low latencies and very high reliability. In one embodiment, when reservations are made, the particular requirements of the End Device 115 can be considered. Additionally, various workloads can involve different requirements. For example, a first operation performed by the drone 140 might utilize redundancy of Fog 110 resources and encryption, while a second operation does not.

Figure 2:
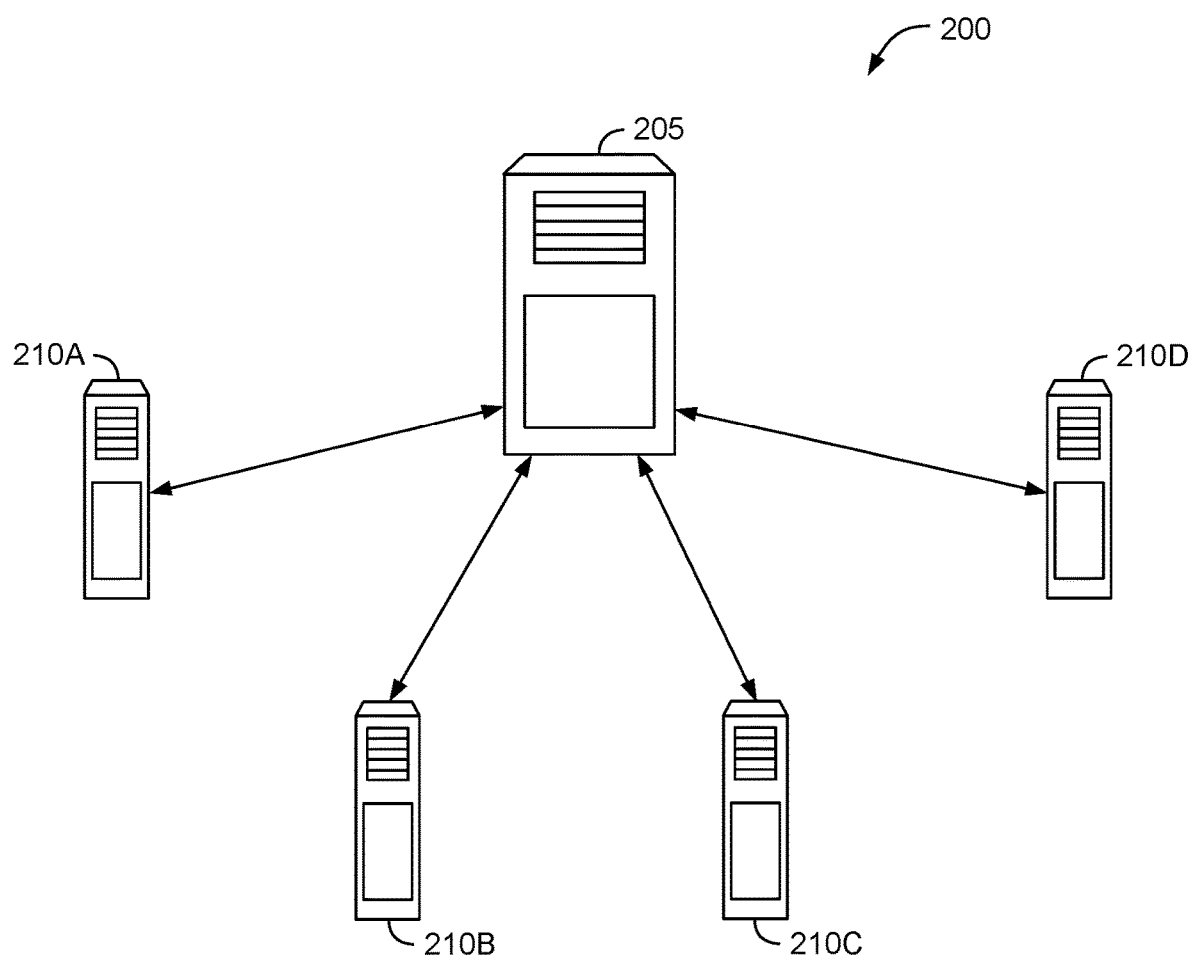
FIG. 2 illustrates a network topology with a fog orchestrator and multiple fog nodes, according to one embodiment of the present disclosure.

FIG. 2 illustrates a Network Topology 200 with a Fog Orchestrator 205 and multiple Fog Nodes 210A-D, according to one embodiment of the present disclosure. As illustrated, each Fog Node 210A-D provides computing resources to other devices, such as the End Devices 115. For example, each Fog Node 210A-D may be one or more computing systems located on or near a gateway, router, or other network device near the edge of the network, such as devices 125, 130A-C, and 132A-B in FIG. 1. Additionally, each Fog Node 210A-D communicates with one or more Fog Orchestrators 205 that manage reservations and provision the resources of the Fog Nodes 210A-D. In some embodiments, each Fog Node 210A-D communicates with a single Fog Orchestrator 205. In other embodiments, a Fog Node 210A-D may communicate with multiple Fog Orchestrators 205.

In one embodiment, Fog Orchestrator 205 is also a fog node that provides computing resources to End Devices 115. For example, a particular fog node may be selected to provide resource provisioning management, in addition to providing computing resources. Similarly, in one embodiment, multiple Fog Nodes 210A-D may be configured with resource reservation and management capabilities, so as to provide redundancy in the event that the Fog Orchestrator 205 fails, and to reduce the provisioning workload. For example, when a new reservation is made or computing resources in the fog change, an update communication can be broadcast throughout a fog mesh, and each Fog Node 210A-D that also operates as a Fog Orchestrator 205 can update its records to reflect the change in the topology 200. As used herein, a fog mesh refers to the collection of Fog Nodes 210A-D and Fog Orchestrators 205.

As will be discussed in more detail below, the Fog Orchestrator 205 generally manages the resources usage of the computing resources of each Fog Node 210A-D beneath it. For example, in one embodiment, each Fog Node 210A-D transmits information about the available computing resources of the respective node to the Fog Orchestrator 205. In one embodiment, this information can include the total computing resources (assuming no workload), and/or the available resources (taking into account the current workload of each respective Fog Node 210A-D). Additionally, in one embodiment, the information about the computing resources includes processor availability, storage capacity, software resources, applications, processes, operations, security, and the like that are available on the Fog Nodes 210A-D.

Further, in one embodiment, the transmitted information about the computing resources of the Fog Nodes 210A-D can include information about the bandwidth of the Fog Nodes 210A-D (e.g., how quickly the node can transmit or receive data, how quickly data can be read/written to the storage or memory of the Fog Nodes 210A-D, etc.) and reliability of the resources (e.g., historical downtime of the resources, an indication of the reliability of the storage based on the type of storage, etc.). In one embodiment, the information can also include an indication of the security available on the Fog Nodes 210A-D (e.g., encryption capabilities) and latency of the Fog Nodes 210A-D (e.g., due to communication delays or latencies within the node itself). Additionally, in one embodiment, the information includes an indication of the geographic location of the respective Fog Nodes 210A-D. Generally, as discussed above, the information received by the Fog Orchestrator 205 can include any information relating to the resources in the Fog Nodes 210A-D or their geographical or topological locations.

In some embodiments, each Fog Node 210A-D transmits updated resource availability to the Fog Orchestrator 205 periodically, such as every minute, every five minutes, every hour, and the like. In some embodiments, each Fog Node 210A-D also updates the Fog Orchestrator 205 when events affecting the availability occur, such as when one or more of the computing resources crash or are down for maintenance, or when all or a portion of the computing resources are being consumed by the Fog Node 210A-D or by a remote device utilizing the resources. In one embodiment, the Fog Orchestrator 205 maintains a record of the computing resources available on each Fog Node 210A-D, which may include both the total resources and the available resources at any given point in time.

In one embodiment, the Fog Orchestrator 205 maintains the records based on existing reservations, and does not require updates from each Fog Node 210A-D unless the Fog Nodes 210A-D fail partially or entirely. For example, rather than transmitting information about the current workload of the Fog Nodes 210A-D, each Fog Node 210A-D may simply transmit an indication that the respective Fog Node 210A-D is working normally. In such an embodiment, the current and future workload of the Fog Nodes 210A-D can then be determined by Fog Orchestrator 205 based on knowledge of the total resources of the Fog Nodes 210A-D and the current reservations that have been made.

In some embodiments, instead of or in addition to each Fog Node 210A-D transmitting resource availability to the Fog Orchestrator 205, the resource information may be obtained from other sources. For example, in one embodiment, an administrator may update records maintained by the Fog Orchestrator 205 when changes are made in the Network Topology 200, such as when a Fog Node 210 is added or removed, or when the resources on a given Fog Node 210A-D are changed. Similarly, in an embodiment, the Fog Orchestrator 205 maintains network telemetry data for each Fog Node 210A-D. For example, in one embodiment, performance properties of each Fog Node 210A-D (e.g., latency) may be determined by the Fog Orchestrator 205. Similarly, in embodiments, this data can be obtained by administrators, by one or more End Devices 115, and/or by devices in the Cloud 105, and reported to the Fog Orchestrator 205.

Figure 3:
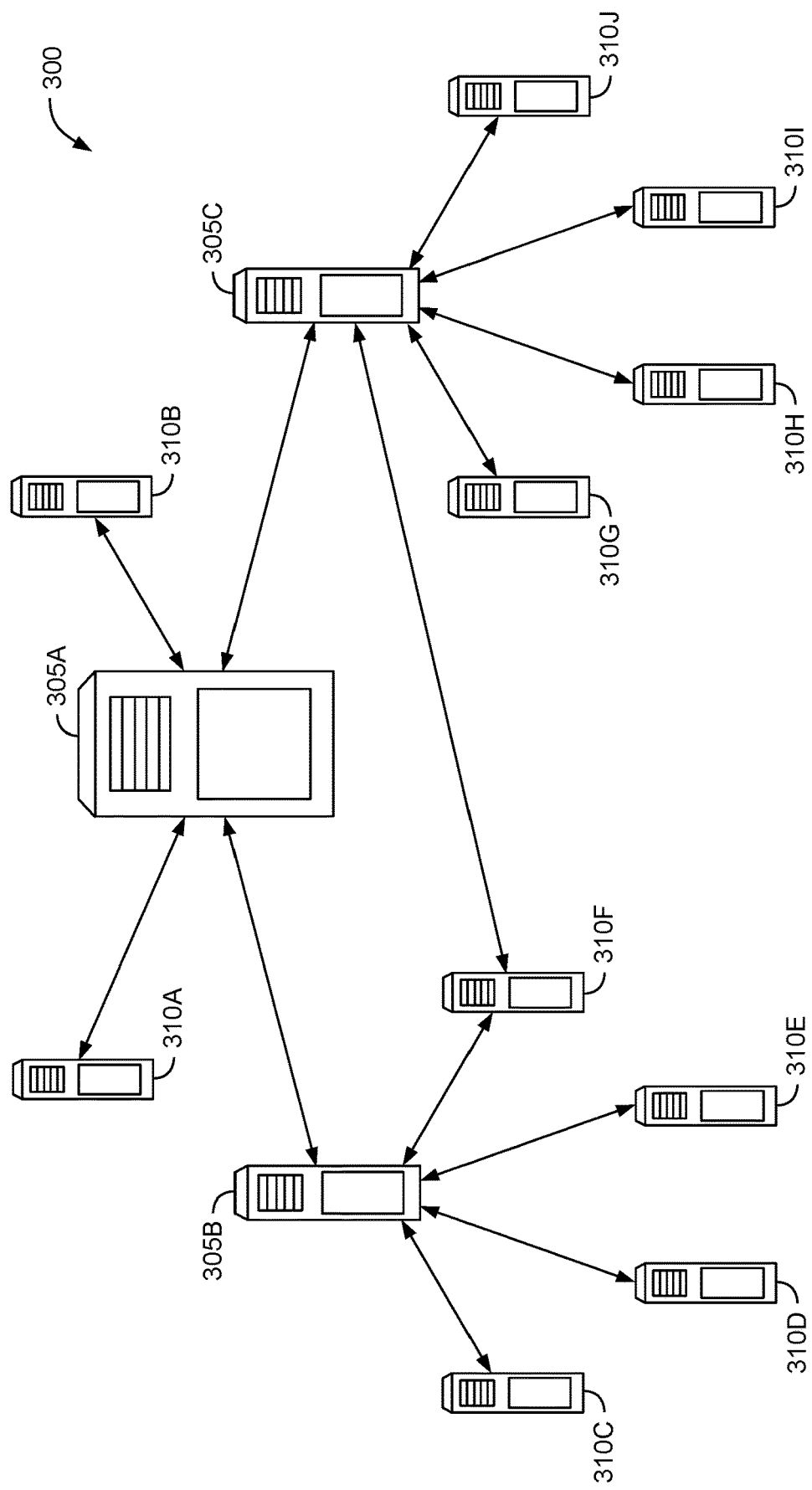
FIG. 3 illustrates a network topology with several fog orchestrators and fog nodes, according to one embodiment of the present disclosure.

FIG. 3 illustrates a Network Topology 300 (e.g., a network hierarchy) with several Fog Orchestrators 305A-C (e.g., similar to Fog Orchestrator 205) and Fog Nodes 310A-J (e.g., similar to Fog Nodes 210A-D), according to one embodiment of the present disclosure. In the illustrated embodiment, the Fog Nodes 310A-B are under the domain of the Fog Orchestrator 305A. That is, the Fog Nodes 310A and 310B generally service computing resource requests that are received by the Fog Orchestrator 310A. Additionally, in one embodiment, the Fog Nodes 310A and 310B provide information to the Fog Orchestrator 305A regarding the resources they offer, as well as current availability. Similarly, the Fog Nodes 310C-F are under the domain and control of the Fog Orchestrator 305B, and the Fog Nodes 310F-J are under the domain of the Fog Orchestrator 305C.

In the illustrated embodiment, the Fog Nodes 310A-J can exist at any level of the Network Topology 300. Additionally, as illustrated, each Fog Orchestrator 305A-C may be controlled in part by one or more other Fog Orchestrators 305A-C higher in the Network Topology 300 (e.g., the Fog Orchestrators 305B and 305C are under the direction of the Fog Orchestrator 305A). That is, in the illustrated embodiment, the Fog Orchestrator 305A may offload reservation requests to the Fog Orchestrator 305B, Fog Orchestrator 305C, or both. Similarly, in the illustrated embodiment, each Fog Orchestrator 305B and 305C may transmit its records regarding fog node availability to the Fog Orchestrator 305A, so as to maintain an accurate and more complete representation of the fog mesh resources. Of course, there may be any number of levels of Fog Nodes 310A-J and Fog Orchestrators 305A-C in a given Topology 300.

Further, in one embodiment, the Fog Nodes 310A-J may be under the domain of more than one Fog Orchestrator 305A-C. For example, in the illustrated embodiment, the Fog Node 310F can service requests that are provided to either Fog Orchestrator 305B or 305C. Additionally, in some embodiments, the Fog Orchestrators 305B and 305C may communicate with each other. For example, if the Fog Orchestrator 305B receives a reservation request that it cannot fulfill (e.g., because none of the Fog Nodes 310C-F have sufficient resources remaining), in one embodiment, the Fog Orchestrator 305B can pass the request to the Fog Orchestrator 305C or 305A to determine whether any of the Fog Nodes 310F-J or Fog Nodes 310A-B that are under the Fog Orchestrator 305C and 305A, respectively, can fulfill the request.

In one embodiment, this communication between the Fog Orchestrators 305A-C may include requests or inquiries, rather than commands that the request be fulfilled. Contrariwise, in one embodiment, one or more of the communications may constitute commands that the Fog Orchestrator 305A-C ensure that the request is fulfilled. In some embodiments, whether a request is a command or inquiry may be determined by the respective levels of the Fog Orchestrators 305A-C in the Topology 300 and network hierarchy, by the content of the request, by the End Device 115 that will utilize the resources, by the process or device that requested the services, and the like.

In one embodiment, fog resources that are reserved for an End Device 115 may span multiple Fog Nodes 310A-J. For example, if the expected workload exceeds the capabilities of any single Fog Node 310A-J, it may be split across multiple nodes by the Fog Orchestrators 305A-C. Similarly, if the workload requires redundancy, multiple Fog Nodes 310A-J may be reserved to perform the same functionality simultaneously, so that the End Device 115 can ensure that the results will be available even if one or more Fog Nodes 310A-J fail or are delayed. In one embodiment, determining whether a reservation spans multiple Fog Nodes 310A-J is based at least in part on the End Device 115 for which the resources are being reserved, or by the device or process that requests the reservation.

Additionally, in one embodiment, multiple Fog Nodes 310A-J may be reserved if the End Device 115 is expected to move during use of the fog resources. For example, if a self-driving vehicle will access the fog resources for image processing, it may be necessary to transfer the workload across multiple Fog Nodes 310A-J as the vehicle moves through geographical space, in order to ensure that the workload is being processed by a nearby Fog Node 310A-J to minimize latency and maximize reliability. At times, this transfer may include transferring the workload between Fog Nodes 310A-J under a single Fog Orchestrator 305A-C. In such an embodiment, the reservation request may include the various geographical locations where resources will be required, along with an indication of the time at which the End Device 115 will be in each location.

At times, transferring the workload between the Fog Nodes 310A-J may require transferring the workload between Fog Nodes 310A-J that are under the domain of multiple Fog Orchestrators 310A-C. In one embodiment, the reservation request includes an indication of the geographical location or locations where the resources will be required. If it is determined that some of the resources should be provided by a Fog Node 310 that is not under the domain of the Fog Orchestrator 310 that received the request, the request may be either forwarded to the appropriate Fog Orchestrator 310A-C to ensure it can be fulfilled, or transmitted to one or more Fog Orchestrators 310A-C higher in the topology 300 to be processed.

In one embodiment, if an End Device 115 moves during use of the computing resources, the Fog Orchestrators 305A-C can respond to this movement by shifting the associated workload. For example, the End Device 115 may be in a first location when it begins to use the fog computing resources, but may move to a different geographical location, perhaps unexpectedly. In one embodiment, the Fog Orchestrator 305 that provided the reservation may detect this movement, with or without an indication from the End Device 115, and transfer the workload as needed.

In some embodiments, reservation requests are provided directly to the Fog Orchestrator 305A-C that controls the Fog Nodes 310A-J which are located closest to the End Device 115. For example, if the fog resources are to be used in a particular geographic area associated with a particular set of Fog Nodes 310A-J (such as the Fog Nodes 310C-F), the reservation request may be transmitted to the appropriate Fog Orchestrator 305 corresponding to that area (e.g., Fog Orchestrator 305B).

In other embodiments, the reservation request may instead be transmitted to an entity in the Cloud 105, or to a Fog Orchestrator 305 that is relatively higher in the topology 300. This may allow reservations to be routed to an appropriate Fog Orchestrator 305 based on a more comprehensive understanding of the status of the fog mesh in the topology 300. In one embodiment, in addition to the location corresponding to the End Device 115 that will be using the fog resources, the request is routed based on the resource availability at each Fog Node 310A-J at the designated time, or based on characteristics of the request (such as required security, applications needed, and the like). For example, a Fog Orchestrator 305A-C or Fog Node 310A-J that is relatively further away from the End Device 115 can be selected instead of utilizing the closest Fog Orchestrator 305A-C or Fog Node 310A-J, based on the workload of the system and/or the characteristics of the request.

In some embodiments, an End Device 115 transmits the reservation request on its own behalf. For example, a wearable device may request processing and storage resources at a specified time in order to perform an operation involving the user's workout routine. Additionally, in some embodiments, reservations are requested on behalf of another device. In one embodiment, End Devices 115 request resources for other End Devices 115. For example, a laptop may request resources for a wearable device at a specified time, rather than the wearable device directly requesting them. In such an embodiment, the laptop (or whatever End Device 115 requested the resource reservation) can forward the confirmation or failure to the wearable device (or whatever End Device 115 the resources are being reserved for). If the reservation was successful, when the appointed time comes, the wearable device (or whatever End Device 115 the resources were reserved for) may directly access the resources without needing to communicate with the laptop (or whatever End Device 115 requested the resource reservation), or may continue to communicate through the laptop.

In a related embodiment, fog resources can be reserved by a device or application more distant in the network topology 300, or further up in the network hierarchy (e.g., in the Cloud 105). For example, in one embodiment, a cloud application may manage resource usage for End Devices 115. For example, an application running in the Cloud 105 may coordinate package deliveries via one or more drones or self-driving vehicles (such as Drone 140 and/or Self-Driving Truck 160). In order to ensure smooth deliveries, the cloud application may transmit reservation requests to various Fog Orchestrators 305A-C. Fog resources can thereby be reserved with Fog Nodes 310A-J in appropriate geographic areas, on behalf of the End Devices 115 (e.g., Drone 140 or Self-Driving Truck 160). In such an embodiment, the reservation requests can include an indication of the End Device(s) that will be using the fog resources.

Continuing the example, the cloud application may determine that a particular End Device 115 is scheduled to deliver a package in a specified geographic area at a specified time. In one embodiment, the application can transmit a reservation request to one or more Fog Orchestrators 305A-C corresponding to the area. In turn, the Fog Orchestrator 305A-C makes the reservation and returns a "success" indication to the cloud application (e.g., an indication including the network address of the resource(s) that have been reserved). This indication can be provided to the End Device 115, which later utilizes the reserved resources to make the delivery when it enters the area and/or the designated time arrives.

As discussed above, in some embodiments, the reservation may be applied across multiple Fog Nodes 310A-J. If the End Device 115 will move across a geographic area during utilization of the fog resources, reservations may be required at multiple Fog Nodes 310A-J. For example, if the resources will be used for navigation (e.g., utilizing processing resources or applications hosted on the Fog Nodes 310A-J for wayfinding or to avoid obstacles), the reservation request can include an indication of the location(s) the resources will be required (e.g., as an anticipated location at specified times during the reservation). In one embodiment, the request is then split into a series of requests corresponding to the different areas. Thus, as the End Device 115 navigates, its navigation workload can be transferred between, for example, Fog Node 310C, then to Fog Node 310E, then to Fog Node 310G, and finally to Fog Node 310I where the delivery is made. Similarly, reservations can be made in the reverse order to accommodate the End Device 115 returning home.

Figure 4:
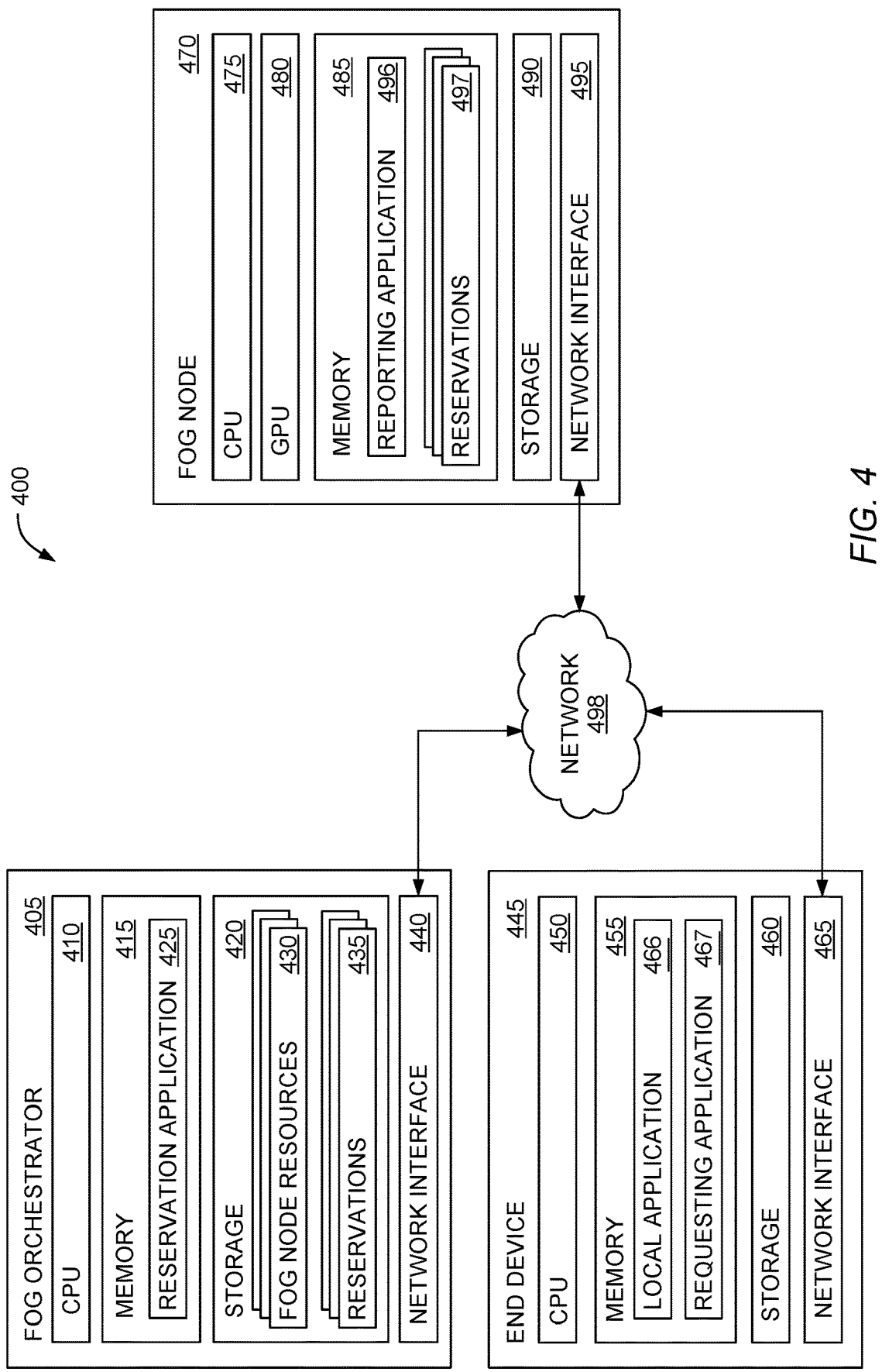
FIG. 4 is a block diagram of a network topology including a fog orchestrator, fog node, and end device, according to one embodiment of the present disclosure.

FIG. 4 is a block diagram of a Network Topology 400 including a Fog Orchestrator 405 (such as Fog Orchestrators 305A-C), a Fog Node 470 (such as Fog Nodes 310A-J), and an End Device 445 (such as End Devices 115), according to one embodiment of the present disclosure. In the illustrated embodiment, the Fog Orchestrator 405, Fog Node 470, and End Device 445 each communicate through a Network 498, which may be wired, wireless, or a combination thereof. As illustrated, Fog Orchestrator 405 contains CPU 410, Memory 415, Storage 420, and Network Interface 440. In the illustrated embodiment, CPU 410 retrieves and executes programming instructions stored in Memory 415 as well as stores and retrieves application data residing in Storage 420. CPU 410 is representative of a single CPU, multiple CPUs, a single CPU having multiple processing cores, and the like. Memory 415 is generally included to be representative of a random access memory. Storage 420 may be a disk drive or flash-based storage device, and may include fixed and/or removable storage devices, such as fixed disk drives, removable memory cards, or optical storage, network attached storage (NAS), or storage area-network (SAN).

As illustrated, the Memory 415 of Fog Orchestrator 405 includes a Reservation Application 425. Similarly, the Storage 420 of Fog Orchestrator 405 includes one or more records of Fog Node Resources 430 and one or more Reservation Records 435. Although the Reservations 435 and Fog Node Resources 430 are illustrated as stored within Storage 420, the Reservations 430 may also be stored in Memory 415 or elsewhere in various embodiments The Reservation Application 425 receives requests to reserve fog resources for one or more End Devices 115, and determine whether sufficient resources are available at the indicated time(s). In the illustrated embodiment, the Fog Orchestrator 405 compares the existing Reservations 435 and the records of Fog Node Resources 430. As illustrated, the records of Fog Node Resources 430 include a record of the resource(s) at each fog node that is within the domain of the Fog Orchestrator 405 (e.g., Fog Node 470). In some embodiments, Fog Orchestrator 405 also confirms the available resources with the selected Fog Node(s) 470 prior to confirming the reservation.

In embodiments, various methods are used to ensure that the fog mesh devices (e.g., each Fog Orchestrator 405 and each Fog Node 470) maintain a synchronized times, such that reservations are not lost or scheduled for the wrong time. These may include utilizing GPS, time sensitive networking, time triggered Ethernet, or any other suitable synchronization technique. In some embodiments, the Fog Orchestrator 405 (or some other device, such as a device in the Cloud 105), periodically transmits synchronization messages to maintain synchronization between the fog devices.

As discussed above, the Fog Node Resources 430 may include the processing capabilities of the respective Fog Node 470, as well as storage capabilities. Similarly, in one embodiment, the Fog Node Resources 430 include security options available on the respective Fog Node 470, reliability of the resources of the Fog Node 470, latency of the Fog Node 470, geographic location of the Fog Node 470, and the like. Similarly, in one embodiment, the Fog Node Resources 430 include software resources, such as applications or operations that are available, including image processing, speech recognition, and the like. Similarly, in one embodiment, some Fog Nodes 470 are reserved for particular End Devices 115 and/or reserved for particular requesters of resources (e.g., particular cloud applications, or particular users). In such an embodiment, the Fog Node Resources 430 can also include this information.

As discussed above, the records of Fog Node Resources 430 can be maintained in a variety of ways. For example, in one embodiment, Fog Node 470 may periodically inform Fog Orchestrator 405 of its resources (e.g., every hour, upon request from Fog Orchestrator 405, upon the level of available resources crossing a predefined threshold, or whenever one or more resources are unavailable for maintenance or other downtime). In one embodiment, if none of the Fog Nodes 470 controlled by the Fog Orchestrator 405 can service the request, the Fog Orchestrator 405 returns an indication that the reservation could not be made. In some embodiments, this failure message includes a reason why the reservation failed (e.g., insufficient resources were available, the End Device 115 lacks sufficient privileges, the requesting application lacks privileges, and the like). In some embodiments, the Fog Orchestrator 405 may additionally or alternatively forward the request to one or more other fog orchestrators which may be able to satisfy it.

In an embodiment, the Fog Orchestrator 405 periodically queries each Fog Node 470 regarding its resource availability. In some embodiments, in addition to providing resource reservations, Fog Orchestrator 405 (or the individual Fog Nodes 470) also provide standby or on-demand fog resources. For example, a portion of the fog resources available in the mesh may be set aside for on-demand usage, such that the standby resources cannot be reserved. In order to maintain an accurate understanding of the actual resource usage (including on-demand usage) of the Fog Nodes 470, Fog Orchestrator 405 may periodically (e.g., every minute, every five minutes, every thirty minutes, every hour, etc.) poll each Fog Node 470 about its current resources.

In one embodiment, the Reservations 435 include record(s) of all of the current reservations that affect one or more Fog Nodes 470 under the control of the Fog Orchestrator 405. In one embodiment, whenever a new reservation is accepted, a new Reservation 435 is made and stored, such that Fog Orchestrator 405 knows which resources remain available for reservation. In some embodiments, accepted Reservations 435 are also transmitted to the affected Fog Node(s) 470, to other Fog Orchestrators 405, or both. In one embodiment, when a new reservation (or a modification to an existing reservation) is requested, Fog Orchestrator 405 determines or predicts whether sufficient resources will be available by comparing the known Fog Node Resources records 430 and the existing Reservation 435. If comparing Fog Node Resources 430 and Reservations 435 indicates that sufficient resources are available at the specified time, Fog Orchestrator 405 may select one or more Fog Node(s) 470 to carry out the future workload. Additionally, in some embodiments, Fog Orchestrator 405 can also confirm with each selected Fog Node 470 that sufficient resources are available/will be available (e.g., confirm that the Fog Node Resources 430 and Reservations 435 are accurate and up-to-date).

As illustrated, the Fog Node 470 contains a CPU 475, GPU 480, Memory 485, Storage 490, and Network Interface 495. Of course, there may be many Fog Nodes 470 with similar or differing resources. CPU 475 is representative of a single CPU, multiple CPUs, a single CPU having multiple processing cores, and the like. Memory 485 is generally included to be representative of a random access memory. Storage 490 may be a disk drive storage device, and may include fixed and/or removable storage devices, such as fixed disk or flash drives, removable memory cards, or optical storage, network attached storage (NAS), or storage area-network (SAN). As discussed above, the Fog Node 470 generally receives workloads from End Devices 445, and completes the requested operation(s) on behalf of the End Device 445. These operations can include storage of data (for any period of time), processing of incoming data (e.g., processing recorded audio, images, or sensor data), use of software resources, and the like.

In the illustrated embodiment, the Memory 485 of the Fog Node 470 includes a Reporting Application 496 and several Reservations 497. In one embodiment, each Fog Node 470 may execute a Reporting Application 496 that periodically reports the current status of the Fog Node 470 (e.g., current resource usage, total resources available, types of resources available, latency, and the like). Additionally, in some embodiments, the Reporting Application 496 receives and responds to requests from the Fog Orchestrator 405 to confirm the available resources at specified times. Further, in some embodiments, the Fog Orchestrator 405 transmits confirmed reservations to the Fog Node(s) 470 that have been selected to service the request, which are stored as Reservations 497 by the selected Fog Node(s) 470. In this way, each Fog Node 470 can determine its available resources at any given point, based on the Reservations 497 and any workload that is currently being executed without a reservation (e.g., as on-demand fog resources). Although the Reservations 497 are illustrated as stored within Memory 485, the Reservations 497 may also be stored in Storage 490 or elsewhere in various embodiments.

As illustrated, the End Device 445 contains CPU 450, Memory 455, Storage 460, and Network Interface 465. The CPU 450 retrieves and executes programming instructions stored in Memory 455 as well as stores and retrieves application data residing in Storage 460. CPU 450 is representative of a single CPU, multiple CPUs, a single CPU having multiple processing cores, and the like. Memory 415 is generally included to be representative of a random access memory. Storage 460 may be a disk drive storage device, and may include fixed and/or removable storage devices, such as fixed or flash disk drives, removable memory cards, or optical storage, network attached storage (NAS), or storage area-network (SAN).

The Memory 455 of End Device 445 includes a Local Application 466 and a Requesting Application 467. In the illustrated embodiment, the Local Application 466 is any application or process executing on the End Device 445. Similarly, the Requesting Application 467 requests reservations of fog resources (e.g., for the Local Application 470), transmits the workload (e.g., a portion of the processing required by Local Application 466) to the Fog Node, and receives an indication from the Fog Orchestrator 405 is the reservation was successful. For example, the Local Application 466 may be navigation software on a delivery drone. In this example, the reservation may be to use the Fog Node 470 to process images or other sensor data transmitted to the reserved Fog Node 470 at a future time, and the results can be used by End Device 445 (e.g., detected obstacles can be avoided).

Figure 5A:
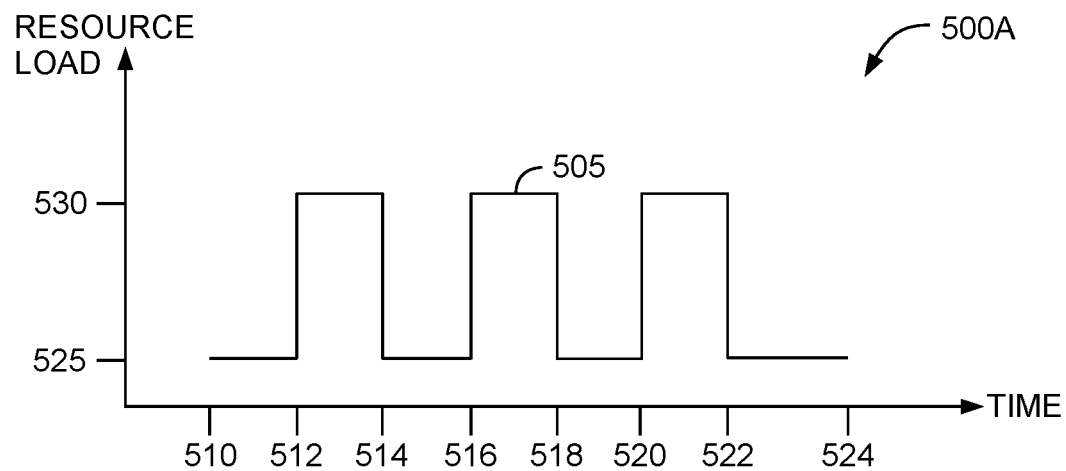
FIG. 5A is a graph of a load profile, according to one embodiment of the present disclosure.

FIG. 5A is a graph 500A of a load profile, according to one embodiment of the present disclosure. In one embodiment, when requesting a reservation, a load profile is provided in order to ensure sufficient and efficient reservations are made. As illustrated, the load profile is graphed with the expected resource load on the vertical axis, and time on the horizontal axis. That is, in the graph 500A, the expected workload at any given point in time is represented by line 505. In one embodiment, the End Device 115 estimates the workload of a process or operation to be completed immediately or in the future in order to generate one or more load profiles. In some embodiments, the load profile(s) are based on previous execution of the operation(s), or other historical data.

In one embodiment, one or more load profiles can be generated for any resource. For example, a first load profile may correspond to expected CPU usage, while a second applies to anticipated GPU usage and a third load profile is associated with estimated storage requirements. Of course, any number of load profiles may be used depending on the specific requirements of the End Device 115. As illustrated, the estimated future resource usage involves bursts of activity between a relatively low level 525 and a relatively higher level 530. For example, the process to be performed may include a series of high-intensity operations, separated by relatively low-intensity background processing. A workload with such bursts of activity could be associated, for example, with a drone capturing video or images (corresponding to a relatively low resource usage) followed by detailed analysis of the video or images (corresponding to a relatively higher resource usage).

In some embodiments, the load profile includes the expected workload at any given moment in time during the reservation. For example, in one embodiment, the reservation request includes an indication of the start and end times of the reservation, and the expected resource usage at any point during the reservation. In some embodiments, the load profile may describe the workload more generally (e.g., surging to level 530 for five seconds before reducing to level 525 for ten seconds, and repeating this cycle for the duration of the request). In one embodiment, the end time of the reservation can be any time in the future, and the start time of the reservation can be any time prior to the end time (including immediately). Similarly, in one embodiment, the request can include a start time and a duration, rather than an end time.

In some embodiments, the load profile is used to define the maximum allowable resource usage of the End Device 445. For example, in one embodiment, Fog Orchestrator 405 reserves only enough resources to meet the load profile. In one embodiment, if the actual workload exceeds the load profile, the End Device 445 must either request additional fog resources or complete the additional workload locally. In other embodiments, Fog Orchestrator 405 may include additional resources in the reservation in case the workload exceeds the load profile. Similarly, in some embodiments, Fog Orchestrator 405 ensures that some predefined portion of the fog resources are always available on a "standby" basis, and does not accept reservations that would cause all resources in the fog mesh to be unavailable.

In one embodiment, the End Device 445 transmits a single reservation request which includes the load profile and the length of the reservation. For example, in the illustrated embodiment in FIG. 5A, End Device 445 may request a reservation from time 510 to time 524, with the illustrated load profile. Similarly, End Device 445 or Fog Orchestrator 405 may separate the reservation into multiple reservations. For example, in one embodiment, End Device 445 may only request fog resources when the expected workload exceeds a predefined threshold. In such an embodiment, multiple fog resource requests can be used: one from time 512 to time 514 at an estimated load of 530, as well as one from time 516 to 518 and one from time 520 to 522. The workload between the bursts (e.g., from time 510 to 512, time 514 to 516, the time 518 to 520, and time 522 to 524) may be completed locally by the End Device 445, or may have separate reservations, each of which may potentially execute on different Fog Nodes 470.

Figure 5B:
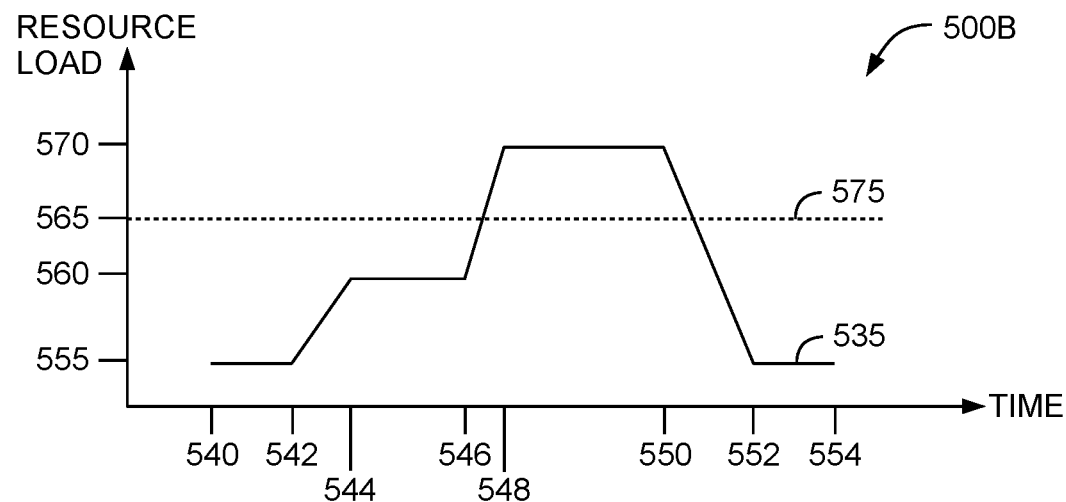
FIG. 5B is a graph of a load profile, according to one embodiment of the present disclosure.

FIG. 5B is another graph 500B of a different load profile, according to one embodiment of the present disclosure. In the illustrated embodiment, the End Device 445 requests fog resources only when the estimated resource usage exceeds a predefined threshold 565, indicated by the horizontal dashed line 575 on the graph 500B. In the depicted graph 500B, the estimated future resource usage is illustrated by line 535. As above, time is on the horizontal axis, while the resource load is graphed on the vertical axis. As illustrated, the expected workload begins at a relatively low level 555 from time 540 to 542. Beginning at 542, the estimated workload increases to level 560 at time 544. The workload than plateaus until time 546, where it again increases to level 570 at time 548. The anticipated load remains steady at level 570 until time 550, when it drops again to level 555 by time 552, and remains until time 554.

In the illustrated embodiment, the expected workload does not exceed the predefined threshold 565 until somewhere between time 546 and 548, and remains there until sometime between time 550 and 552. As such, in one embodiment, the End Device 445 may request that fog resources be reserved only from time 548 to time 550, or from time 546 to time 552. In some embodiments, End Device 445 and/or Fog Orchestrator 405 reserve fog resources with some amount of extra time before and/or after the expected workload, in order to ensure the requirements are met.

In some embodiments, the Fog Orchestrator 405 can determine the load profile for a reservation based on historic resource usage. For example, previous reservations and/or fog resource usage of one or more End Devices 445 may be used to assign load profiles to new reservations that do not include a load profile. In some embodiments, previous fog resource usage of the particular End Device 445, or a user associated with the End Device 445, is used to generate the load profile. In other embodiments, fog resource usage of similar End Devices 445 is used (e.g., fog resource usage of all wearable exercise trackers, or of similar delivery drones). In an embodiment, one or more machine learning models are utilized to generate and assign load profiles to reservation requests.

Additionally, in some embodiments, the length of the reservation can be similarly determined by the Fog Orchestrator 405, based on the End Device 445 that transmitted the reservation request. For example, in an embodiment, a smartwatch may transmit a reservation request for fog resources for a workout routine at a specified time. Based on prior fog resource usage (by the particular smartwatch and/or by similar End Devices 445), the Fog Orchestrator 405 may learn what a typical load profile and duration look like, and assign such a profile to the current reservation request.

Although the illustrated load profiles in FIGS. 5A and 5B show only the expected resource usage over time, in some embodiments, the load profile can also include other characteristics of the workload, such as security requirements, redundancy requirements, reliability requirements, latency requirements, performance requirements, and the like. Of course, in some embodiments, these characteristics may be included in the reservation request separately from the load profile(s). In one embodiment, performance requirements can include a minimum CPU or GPU clock speed, read or write performance of storage devices, and the like.

In one embodiment, security requirements can include any encryption required. Similarly, security requirements may include an indication that the workload can only be executed on Fog Node(s) 470 that are not currently executing other workloads, or that are only currently executing workloads for the particular End Device 445. Similarly, security requirements may require that the workload only be executed on specified or pre-approved Fog Node(s) 470.

In one embodiment, redundancy requirements indicate that additional fog resources should be reserved. For example, in one embodiment, fog resources on at least two Fog Nodes 470 can be reserved in parallel, such that the operation(s) of the End Device 445 can be completed even if one or more Fog Nodes 470 fail or are unreachable over the network (e.g., because of congestion, the failure of one or more network links, etc.). This may be particularly important for End Devices 445 such as self-driving vehicles and drones, which require constant connection in order to function correctly. In some embodiments, the workload is processed in parallel simultaneously on all of the selected Fog Nodes 470, so that there is never an interruption for the End Device 445.

In one embodiment, reliability requirements generally indicate how reliable the reserved resources must be. For example, based on historical downtime, it may be determined that a particular Fog Node 470 is not particularly reliable, and therefore should not be tasked with hosting operations that must be highly reliable. Similarly, some types of storage may be less reliable than others, and processes that require highly reliable storage may be routed towards the Fog Nodes 470 that contain more reliable types of storage.

In one embodiment, latency requirements include an indication as to how quickly the End Device 445 needs the results. In determining whether a particular Fog Node 470 satisfies the latency requirements of a particular request, Fog Orchestrator 405 may consider aspects of the Fog Node 470 itself (e.g., the speed of CPU 475 and GPU 480, the read/write speed of Storage 490, etc.) as well as any network delays (e.g., due to network congestion, the physical location of the Fog Node 470, etc.), and the historic latency of the Fog Node 470. In one embodiment, if a particular fog resource reservation must be low-latency, Fog Orchestrator 405 can route the request only to Fog Nodes 470 that are geographically or topologically near to the End Device 445, only Fog Nodes 470 with sufficiently high clock speeds, sufficiently fast network connectivity, and the like.

Figure 6:
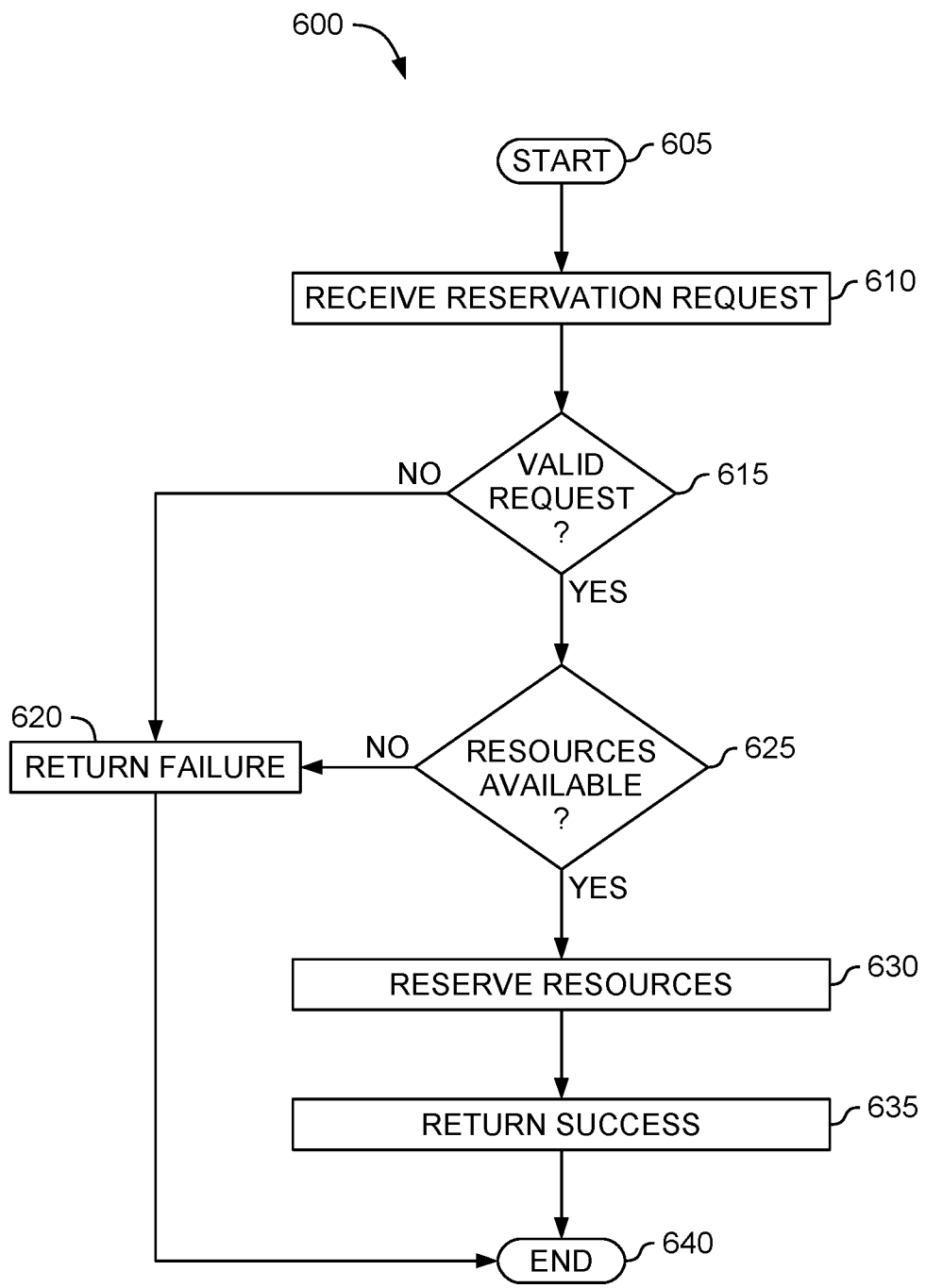
FIG. 6 is a flow diagram for provisioning fog computing resources, according to one embodiment of the present disclosure.

FIG. 6 is a flow diagram illustrating a method 600 of provisioning fog computing resources, according to one embodiment of the present disclosure. The method 600 begins at block 605. At block 610, Fog Orchestrator 405 receives a fog computing resource reservation request, as discussed above. This request may be transmitted by the End Device 445, or by a proxy (e.g., another device, process, or application) on behalf of the End Device 445. The method 600 proceeds to block 615, where Fog Orchestrator 405 determines whether the request is valid.

In various embodiments, determining the validity of a request can include several operations. In one embodiment, determining the validity of the request involves determining whether the End Device 445 that is specified in the request has the required privileges to make the reservation. For example, in one embodiment, some End Devices 445 are not allowed to reserve resources and must rely on "standby" fog resources. Similarly, in one embodiment, some End Devices 445 can reserve certain fog resources but not others (e.g., CPU resources but not GPU resources). In another embodiment, determining the validity of a reservation request includes verifying that the proxy which transmitted the request is sufficiently privileged and/or has proper security status to make such a request. For example, as above, some proxies may not be allowed to make reservations, or may be limited to only certain resources. Similarly, a proxy may be allowed to request resources for some End Devices 445, but not for all.

In one embodiment, determining the validity of the request includes verifying that the End Device 445 and/or the proxy have not exceeded their reservation limits. For example, in some embodiments, End Devices 445 and/or proxies may be limited in the number of reservations they can make, the amount of fog computing resources reserved (total or at any given time), and the like. In one embodiment, the reservation limits can be affected by a subscription plan or payment plan associated with the End Device 445 and/or proxy.

If, at block 615, the Fog Orchestrator 405 determines that the request is not valid, the method 600 proceeds to block 620, where an indication of failure is returned to the requesting entity (e.g., the End Device 445 or the proxy). In some embodiments, this notification includes an indication as to why the request failed. If, however, Fog Orchestrator 405 determines that the request is valid, the method 600 proceeds to block 625, where Fog Orchestrator 405 determines whether sufficient resources are available in the mesh. In one embodiment, if the resources included within Fog Nodes 470 controlled by Fog Orchestrator 405 are insufficient to satisfy the request, Fog Orchestrator 405 may forward some or all of the request to one or more other Fog Orchestrators to see whether they can service some or all of the request.

In one embodiment, if the Fog Orchestrator 405 determines that at least a portion of the reservation cannot be made (e.g., because insufficient resources are available), the method 600 proceeds to block 620 where a failure indication is provided. As above, this may include an indication as to the reason for the failure. In some embodiments, if resources are available to service a portion of the request, that portion is reserved and a failure indication is provided for the remainder. For example, if resources are available for some subset of the time period, or resources are available for the whole time, but they are insufficient for the expected workload. In some embodiments, the End Device 445 and/or the proxy may confirm whether they wish to make the partial reservation or cancel the request.

In one embodiment, as discussed above, the Fog Orchestrator 405 determines whether sufficient resources are available by comparing the Reservations 435 with the records of the Fog Node Resources 430. In some embodiments, the Fog Orchestrator 405 also confirms that the selected Fog Node(s) are still available (e.g., by transmitting a confirmatory signal). If no response is received (or a response indicating that sufficient resources will not be available), the Fog Orchestrator 405 can move on to select a different Fog Node 470, if possible. Additionally, in some embodiments, the Fog Orchestrator 405 ensures that some subset of the fog resources is maintained as "standby" resources and cannot be reserved.

If, at block 625, the Fog Orchestrator 405 determines that sufficient resources are available at the specified time(s), the method 600 proceeds to block 630, where a record of the reservation is stored by the Fog Orchestrator 405 (e.g., in Reservations 435). In some embodiments, the Fog Orchestrator 405 also transmits information about the reservation to the selected Fog Node(s) 470 and/or other Fog Orchestrators 405, which may store the reservation locally (e.g., in Reservations 497) in order to ensure the system maintains consistency.

The method 600 then proceeds to block 635, where an indication of success is transmitted by the Fog Orchestrator 405 to the End Device 445 and/or proxy. In some embodiments, this success transmission also includes a reference to the Fog Node(s) 470 or particular fog computing resources that have been reserved. For example, the "success" indication may include a network address of the selected fog node(s), a network address of the selected fog resources on the selected fog node(s), or both. If a proxy application made the request, this address may be forwarded by the proxy to the End Device 445. The method 600 then terminates at block 640. When the beginning of the reservation time arrives, the End Device 445 can communicate directly with the selected Fog Node(s) 470, or through Fog Orchestrator 405 to utilize the reserved fog computing resources.

Figure 7:
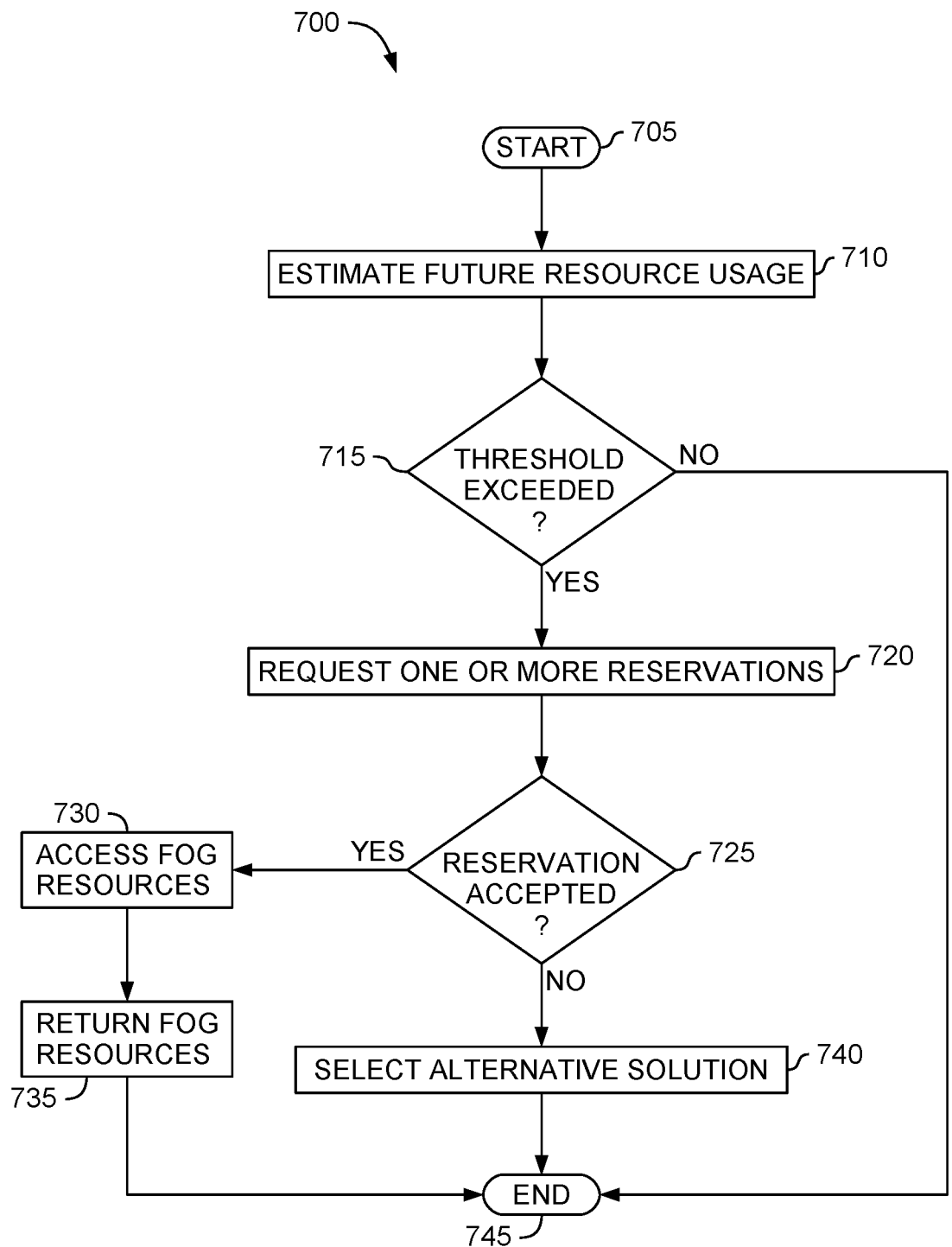
FIG. 7 is a flow diagram for requesting fog computing resources, according to one embodiment of the present disclosure.

FIG. 7 is a flow diagram illustrating a method 700 of requesting fog computing resources, according to one embodiment of the present disclosure. The method 700 begins at block 705. At block 710, the future resource usage of an End Device 445 is estimated, such as by considering the needs of one or more tasks that are expected to be running or executing at a future time. As discussed above, this step may be completed by the End Device 445 that will utilize the resources. For example, an IoT device can estimate the computing resources it will require to complete a particular operation in the future. Additionally, in some embodiments, another end device (such as a different IoT device) can estimate the future resource usage of the End Device 445, as discussed above. Similarly, in some embodiments, an application or device operating remotely, such as in the cloud, estimates the future resource usage of the End Device 445. In some embodiments, the End Device 445 may estimate its own resource usage, even if the actual fog resource reservation is later requested by a proxy.

At block 715, the End Device 445, proxy device, or Fog Orchestrator 405 determines whether a predefined threshold of resource usage is exceeded. This threshold can be set in a number of ways. In one embodiment, the predefined threshold is determined based on the resources available locally for the End Device 445. In one embodiment, the threshold is at least partially based on the task or operation that the End Device 445 is performing (e.g., highly important tasks may be preferably executed using fog resources, and thus a lower threshold may be utilized). In one embodiment, the threshold is set by a user or administrator. In one embodiment, the threshold is computed and dynamically adjusted using machine learning techniques. Of course, in some embodiments, a threshold is not used to determine whether a workload should be offloaded to fog resources. Instead, in one embodiment, all resource usage associated with one or more tasks or workloads is offloaded. For example, in one embodiment, all image processing is offloaded, regardless of the estimated resources required. Additionally, in some embodiments, tasks are offloaded because a required hardware or software module is not available locally.

In one embodiment, the End Device 445 compares the estimated future resource usage with the predefined threshold locally. In some embodiments, whether the threshold is exceeded is determined by one or more other IoT devices, or by a device or application operating in the cloud. Additionally, in embodiments that do not utilize a threshold, the determination of whether to offload the future computing can be made by the other IoT device(s) and/or the remote device/cloud application in other ways, as discussed above.

If it is determined at block 715 that the estimated future resource usage does not exceed the threshold, the method 700 proceeds to block 745, where the method 700 terminates. Of course, in embodiments not utilizing a predefined threshold, other determinations may be made. For example, in one embodiment, if it is determined that all required hardware and software modules are available locally, the method 700 may proceed to block 745 and terminate. Similarly, in one embodiment, the method 700 may terminate if it is determined that the future workload is one that is designated to be executed locally (e.g., by a programmer, administrator, or user) rather than remotely.

If, however, it is determined at block 715 that the threshold will be exceeded, the method 700 proceeds to block 720, where one or more reservations are requested. Of course, as above, this determination may additionally or alternatively include a determination that the workload requires one or more hardware or software modules that are not locally available, that the workload has been designated for remote execution, and the like. In embodiments, the reservation(s) may be requested by the End Device 445 itself, or by one or more proxies, such as other IoT device(s) and/or cloud device(s) or application(s).

As discussed above, the reservation(s) may take several forms, in various embodiments. For example, in one embodiment, a single reservation request is transmitted to the Fog Orchestrator(s) 405, and the request may be divided or partitioned as needed (for example, to cover a larger geographic area or to spread the workload). In some embodiments, the device or application that transmits the request(s) may transmit multiple requests in order to cover different time periods, different locations, and the like. Similarly, as discussed above, this request may be transmitted to the Fog Orchestrator(s) 405 at the edge of the network (e.g., near the End Device 445), or may be transmitted to one or more Fog Orchestrator(s) 405 further up in the topology, and routed to the appropriate edge device(s).

Once the Fog Orchestrator(s) 405 receive the reservation request(s), it will either be accepted or rejected, as discussed above in reference to FIG. 6. The method 700 proceeds to block 725, where it is determined whether the reservation was accepted or rejected. In one embodiment, this determination is made by whichever device or application transmitted the request (e.g., the End Device 445, one or more other IoT device(s), one or more cloud device(s) or applications, etc.). If the reservation was accepted, the method 700 proceeds to block 730, where the End Device 445 accesses the fog resources when the appointed time arrives.

If the End Device 445 requested the reservation for itself, it may proceed to access the fog resources using the address provided by the Fog Orchestrator(s) 405. If a proxy or application requested the reservation, as discussed above, the proxy may transmit the address(es) of the fog resources to the End Device 445 as soon as the reservation is confirmed. In one embodiment, when the reservation begins, the End Device 445 communicates directly with the Fog Node(s) 470 providing the resources to offload the workload.

Once the reservation has ended (e.g., the time designated as the end of the reservation as arrived, the duration specified in the request has elapsed, or the End Device 445 signals that it has completed its use of the fog resources), the method 700 proceeds to block 735, where the fog resources are released by the End Device 445. Of course, in one embodiment, the Fog Node(s) 470 may simply cease providing the fog resources to the End Device 445, without the need for the End Device 445 to take any action. In some embodiments, if fog resources are available (e.g., standby resources), the End Device 445 may continue to utilize the fog resources until the workload is completed, or until the resources are no longer available (e.g., because of other reservations). Once the End Device 445 has stopped using the fog resources, the method 700 terminates at block 745.

If, at block 725, it is determined that the Fog Orchestrator(s) 405 have rejected the reservation, the method 700 proceeds to block 740 to select an alternative solution. This may take various forms in different embodiments. In one embodiment, the End Device 445 may simply perform the workload locally, without relying on fog resources. In another embodiment, the End device 445 (or a proxy) can transmit one or more additional reservation requests to the same Fog Orchestrator(s) 405 or others, potentially adjusting the requested time and/or fog resources, in order to secure a reservation.

In an embodiment, the End Device 445 may request a fog resource reservation with another provider's fog mesh. For example, in some embodiments, an End Device 445 may prefer to utilize fog resources from a first provider (e.g., because of discounted rates). If a rejection is received, however, the End Device 445 may transmit a reservation request to one or more different providers of fog resources in order to complete the workload. In some embodiments, it may simply be determined that the workload cannot be completed at this time. Of course, any other mitigation can be used in various embodiments. Finally, the method 700 terminates at block 745.

Figure 8:
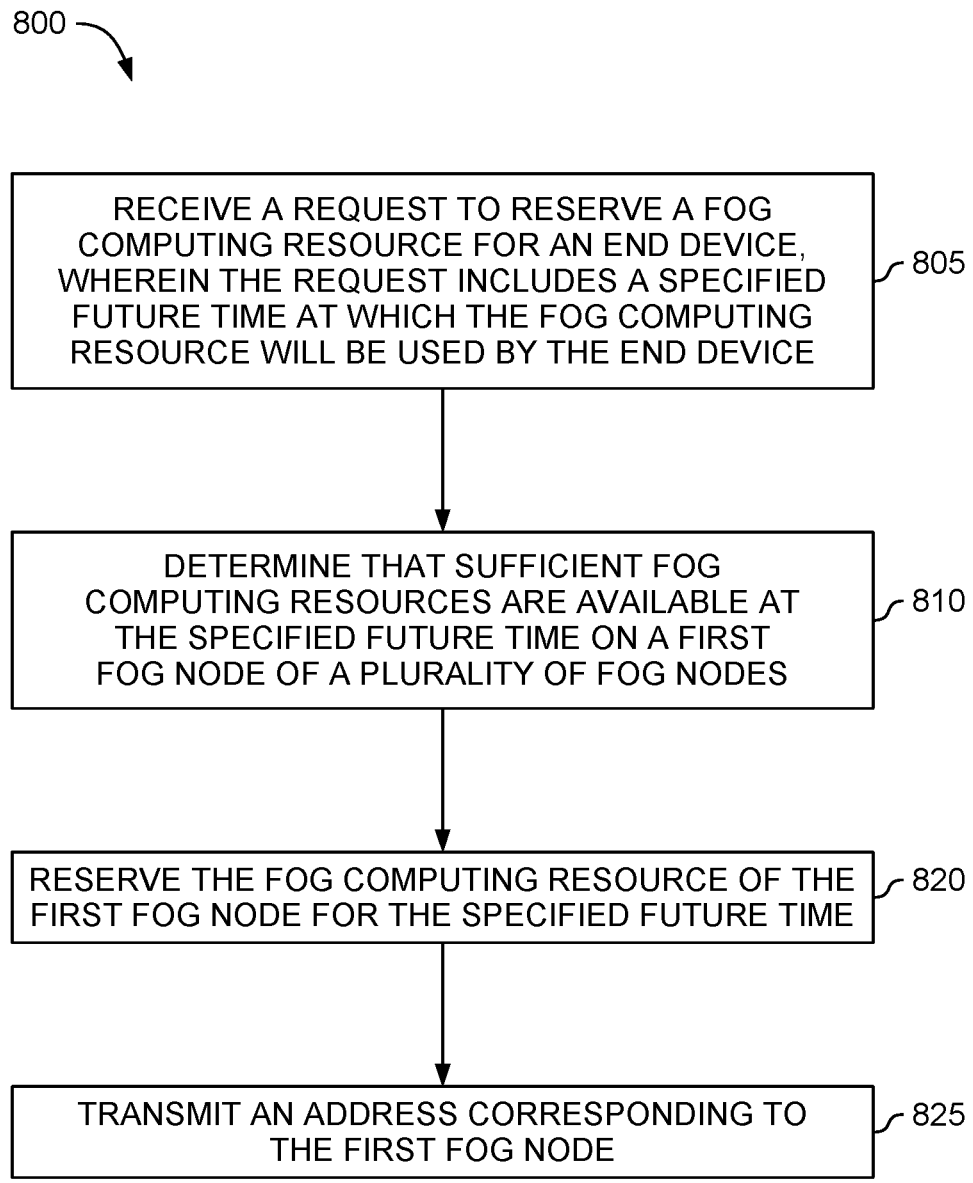
FIG. 8 is a flow diagram for provisioning fog computing resources, according to one embodiment of the present disclosure.

FIG. 8 is a flow diagram illustrating a method 800 of provisioning fog computing resources, according to one embodiment of the present disclosure. The method 800 begins at block 805, where Fog Orchestrator 405 receives a request to reserve a fog computing resource for an end device, wherein the request includes a specified future time at which the fog computing resource will be used by the end device. This block is discussed in more detail above in relation to block 610 of FIG. 6. The method 800 then proceeds to block 810, where Fog Orchestrator 405 determines that sufficient fog computing resources are available at the specified future time (and, in some embodiments, at the specified location) on a first fog node of a plurality of fog nodes. This determination is described in more detail with reference to block 625 of FIG. 6, above.

The method 800 continues to block 820, where the Fog Orchestrator 405 reserves the fog computing resource of the first fog node for the specified future time. As discussed above, this may comprise storing a record or updating the records that contain the reservations, and in some embodiments, includes broadcasting the reservation to one or more other edge devices. The method 800 finishes at block 825, where Fog Orchestrator 405 transmits an address corresponding to the first fog node. This block is discussed in more detail above, especially in regards to block 635 of FIG. 6.

Figure 9:
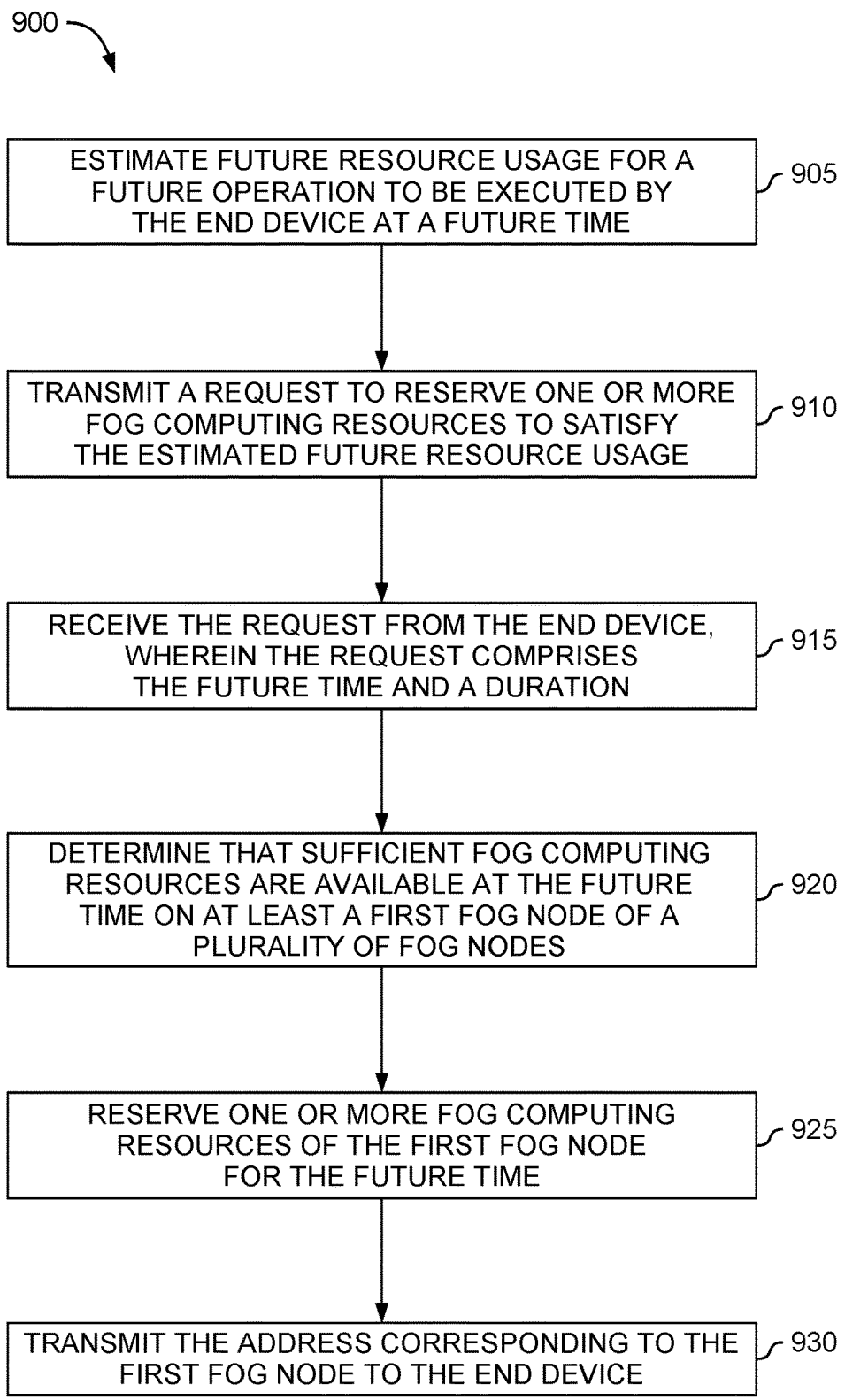
FIG. 9 is a flow diagram for requesting and provisioning fog computing resources, according to one embodiment of the present disclosure.

FIG. 9 is a flow diagram illustrating a method 900 of requesting and provisioning fog computing resources, according to one embodiment of the present disclosure. The method 900 begins at block 905, where future resource usage for a future operation to be executed by the end device at a future time is estimated. This estimation may be completed by End Device 445 or a proxy, as discussed in more detail with reference to block 710 of FIG. 7. The method 900 continues to block 910, where a request to reserve one or more fog computing resources to satisfy the estimated future resource usage is transmitted to the Fog Orchestrator(s) 405 by the End Device 445 and/or proxy, as explained in more detail above in the discussion surrounding block 720 of FIG. 7. At block 915, Fog Orchestrator 405 receives the request from the end device, wherein the request comprises the future time and a duration. This step is explained in more detail above with reference to block 610 of FIG. 6 and block 805 of FIG. 8.

At block 920, Fog Orchestrator 405 determines that sufficient fog computing resources are available at the future time on at least a first fog node of a plurality of fog nodes, as discussed in more detail in relation to block 810 of FIG. 8 and block 625 of FIG. 6. The method 900 proceeds to block 925, where Fog orchestrator 405 reserves one or more fog computing resources of the first fog node for the future time, similar to the above discussion in regards to block 820 of FIG. 8 and block 630 of FIG. 6. Finally, the method 900 finishes at block 930, where Fog Orchestrator 405 transmits the address corresponding to the first fog node to the end device. As discussed above in reference to block 825 of FIG. 8 and block 635 of FIG. 6, this address can be transmitted to the End Device 445 or a proxy, depending on the particular embodiment.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications a cloud application that generates or routes reservation requests, or related data available in the cloud. For example, the cloud application could execute on a computing system in the cloud and generate reservation requests for end devices, which are transmitted to fog orchestrators near the edge of the network. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
an end device comprising a load application configured to:
estimate future resource usage for a future operation to be executed by the end device, wherein the future resource usage comprises a sequence of geographic locations, each geographic location associated with a respective future time of a plurality of future times; and
transmit a request to reserve one or more fog computing resources to satisfy the estimated future resource usage; and
a fog orchestrator comprising a reservation application configured to:
receive the request from the end device, wherein the request comprises the sequence of geographic locations and the plurality of future times and includes a request for redundant fog computing resources;
responsive to receiving the request from the end device:
identify a plurality of pre-existing reservations for a first future time of the plurality of future times on a first fog node of the plurality of fog nodes, wherein the first fog node is associated with a first geographic location in the sequence of geographic locations;

identify a predefined standby portion of resources for the first fog node that cannot be reserved for future times and can only be allocated for immediate use upon request;

determine, based on the plurality of pre-existing reservations and the predefined standby portion of resources, that sufficient fog computing resources will be available at the first future time on the first fog node; and determine that sufficient fog computing resources will be available on a second fog node of the plurality of fog nodes at a second future time of the plurality of future times, wherein the second fog node is associated with a second geographic location in the sequence of geographic locations;

reserve one or more fog computing resources of the first fog node for the first future time;

reserve one or more fog computing resources of the second fog node for the second future time;

reserve fog computing resources on two or more fog nodes of the plurality of fog nodes to execute one or more operations for the end device in parallel;

transmit, to the second fog node, a copy of the reservation, wherein the copy of the reservation specifies (i) the second future time, (ii) the estimated future resource usage, and (iii) an identity of the end device; and transmit addresses corresponding to the first and second fog nodes to the end device.

2. The system of claim 1, wherein the load application transmits the request to reserve the one or more fog computing resources upon determining that the future resource usage exceeds a predefined threshold.

3. The system of claim 1, wherein the request to reserve one or more fog computing resources includes a load profile of the estimated future resource usage, wherein the load profile comprises an indication of one or more needed software resources.

4. The system of claim 1, wherein the request to reserve one or more fog computing resources includes the first geographic location where the end device will be during execution of the future operation, and wherein determining that sufficient fog computing resources are available comprises evaluating availability of one or more fog nodes associated with the first geographic location.

5. The system of claim 1, wherein the load application is further configured to:

receive an address of the one or more fog computing resources; and use the one or more fog computing resources to execute the future operation.

6. One or more non-transitory tangible media encoding logic that includes instructions for execution that when executed by a processor, is operable to perform an operation comprising:

receiving a request to reserve a fog computing resource for an end device, wherein the request includes a sequence of geographic locations and a plurality of future times at which the fog computing resource will be used by the end device, each geographic location associated with a respective future time of the plurality of future times, and wherein the request further includes a request for redundant fog computing resources;

responsive to receiving the request from the end device:

identifying a plurality of pre-existing reservations for a first future time of the plurality of future times on a first fog node of the plurality of fog nodes, wherein the first fog node is associated with a first geographic location in the sequence of geographic locations;

identifying a predefined standby portion of resources for the first fog node that cannot be reserved for future times and can only be allocated for immediate use upon request;

determining, based on the plurality of pre-existing reservations and the predefined standby portion of resources, that sufficient fog computing resources will be available at the specified first future time on the first fog node; and determining that sufficient fog computing resources will be available on a second fog node of the plurality of fog nodes at a second future time of the plurality of future times, wherein the second fog node is associated with a second geographic location in the sequence of geographic locations;

reserving the fog computing resource of the first fog node for the first future time;

reserving one or more fog computing resources of the second fog node for the second future time;

reserving fog computing resources on two or more fog nodes of the plurality of fog nodes to execute one or more operations for the end device in parallel;

transmitting, to the second fog node, a copy of the reservation, wherein the copy of the reservation specifies (i) the second future time, (ii) the estimated future resource usage, and (iii) an identity of the end device; and transmitting addresses corresponding to the first and second fog nodes to the end device.

7. The one or more non-transitory tangible media of claim 6, wherein the request to reserve the fog computing resource was transmitted by a proxy acting on behalf of the end device.

8. The one or more non-transitory tangible media of claim 6, wherein the request to reserve the fog computing resource includes a length of time during which the fog computing resource will be used by the end device.

9. The one or more non-transitory tangible media of claim 6, wherein the request to reserve the fog computing resource includes a load profile describing an estimated workload of the end device at the specified future time, wherein the load profile comprises an indication of one or more needed software resources.

10. The one or more non-transitory tangible media of claim 6, wherein the request to reserve the fog computing resource includes a first geographic location where the end device will be located during the specified future time, and wherein determining that sufficient fog computing resources are available comprises evaluating availability of one or more fog nodes associated with the first geographic location.

11. The one or more non-transitory tangible media of claim 10, wherein the request to reserve the fog computing resource further includes a second geographic location where the end device will be located during a second specified future time during a window of time indicated by the request, the operation further comprising:

determining that sufficient fog computing resources are available at the second specified future time on a second fog node; and reserving fog computing resource of the second fog node for the second specified future time.

12. The one or more non-transitory tangible media of claim 6, wherein the request to reserve the fog computing resource includes security requirements of the requested fog computing resource, wherein the security requirements include encryption requirements.

13. The one or more non-transitory tangible media of claim 6, wherein the plurality of fog nodes are located at an edge of a network near the end device.

14. The one or more non-transitory tangible media of claim 6, the operation further comprising:
   determining that a device that transmitted the request to reserve the fog computing resource is authorized to reserve the fog computing resource.

15. An apparatus comprising:
   at least one processor; and
   at least one memory element storing data, which, when executed on the processor, performs an operation comprising:
      receiving a request to reserve a fog computing resource for an end device, wherein the request includes a sequence of geographic locations and a plurality of future times at which the fog computing resource will be used by the end device, each geographic location associated with a respective future time of the plurality of future times, and wherein the request further includes a request for redundant fog computing resources;
      responsive to receiving the request from the end device:
         identifying a plurality of pre-existing reservations for a first future time of the plurality of future times on a first fog node of the plurality of fog nodes, wherein the first fog node is associated with a first geographic location in the sequence of geographic locations;
         identifying a predefined standby portion of resources for the first fog node that cannot be reserved for future times and can only be allocated for immediate use upon request;
         determining, based on the plurality of pre-existing reservations and the predefined standby portion of resources, that sufficient fog computing resources will be available at the specified first future time on the first fog node; and
         determining that sufficient fog computing resources will be available on a second fog node of the plurality of fog nodes at a second future time of the plurality of future times, wherein the second fog node is associated with a second geographic location in the sequence of geographic locations;
      reserving the fog computing resource of the first fog node for the first future time;
      reserving one or more fog computing resources of the second fog node for the second future time;
      reserving fog computing resources on two or more fog nodes of the plurality of fog nodes to execute one or more operations for the end device in parallel;
      transmitting, to the second fog node, a copy of the reservation, wherein the copy of the reservation specifies (i) the second future time, (ii) the estimated future resource usage, and (iii) an identity of the end device; and
      transmitting addresses corresponding to the first and second fog nodes to the end device.

16. The apparatus of claim 15, wherein the request to reserve the fog computing resource was transmitted by a proxy acting on behalf of the end device.

17. The apparatus of claim 15, wherein the request to reserve the fog computing resource includes a length of time during which the fog computing resource will be used by the end device.

18. The apparatus of claim 15, wherein the request to reserve the fog computing resource includes a load profile describing an estimated workload of the end device at the specified future time, wherein the load profile comprises an indication of one or more needed software resources.

19. The apparatus of claim 15, wherein the request to reserve the fog computing resource includes a first geographic location where the end device will be located during the specified future time, and wherein determining that sufficient fog computing resources are available comprises evaluating availability of one or more fog nodes associated with the first geographic location.

* * * * *

UNITED STATES PATENT AND TRADEMARK OFFICE
CERTIFICATE OF CORRECTION

PATENT NO. : 11,140,096 B2
APPLICATION NO. : 15/891189
DATED : October 5, 2021
INVENTOR(S) : M. David Hanes et al.

Page 1 of 1

It is certified that error appears in the above-identified patent and that said Letters Patent is hereby corrected as shown below:

In the Specification

In Column 10, Line 21, delete "embodiments" and insert -- embodiments. --, therefor.

In Column 21, Line 10, delete "users" and insert -- user's --, therefor.

In the Claims

In Column 23, Line 12, in Claim 1, delete "ata" and insert -- at a --, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*